July 9, 1963 H. J. CARTER 3,097,353

RELAY CONTROL CIRCUIT

Filed April 17, 1961 2 Sheets-Sheet 1

INVENTOR.
Howard J. Carter
BY
Weingarten, Orenbuch, & Pandiscio
Attorneys

INVENTOR.
Howard J. Carter
BY
Weingarten, Orenbuch, & Pandiscio
Attorneys

3,097,353
RELAY CONTROL CIRCUIT

Howard J. Carter, Newport Beach, Calif., assignor to Epsco Incorporated, Cambridge, Mass., a corporation of Massachusetts Filed Apr. 17, 1961, Ser. No. 103,276
4 Claims. (Cl. 340—253)

This invention relates in general to multiplexing systems of the type employing relays to connect the input signal channels to the system's output and more particularly pertains to a circuit for preventing malfunctioning of the system and providing a fault signal when an incipient malfunction occurs.

The primary purpose of the invention is to prevent more than one input signal channel in a multiplexing system from simultaneously being connected to the system's output. A secondary purpose is to signal that a fault has occurred when, upon command from an external control device, either more than one relay attempts to operate or when no relay attempts to operate. A further objective of the invention is to minimize the power required to hold the selected relay in its operative position after its initial operation.

The invention resides in causing the current flowing through the winding of the selected input relay to be compared with the current flowing through the winding of a comparison relay and employing a differential amplifier to determine when an unbalance exists. In response to an enable signal, a first switching amplifier connects a first current source to all the relay windings and, after an interval determined by a monostable multivibrator, the relay windings are connected to a second source which holds the operated selected relay and comparision relays in their energized positions during the remainder of the enabling signal. In the event that more than one input relay is actuated during the same period or in the event that none of the signal relays is actuated during the enabling signal, the unbalanced differential amplifier causes a flip-flop to put out a signal inhibiting a pair of AND gates from passing the enable signal, whereupon all the relays are disconnected from their current source and a fault signal is simultaneously put out by the flip-flop.

The invention, both as to its organization and operation, can be better understood from a perusal of the following exposition when considered in conjunction with the accompanying drawings in which.

Figure 3:
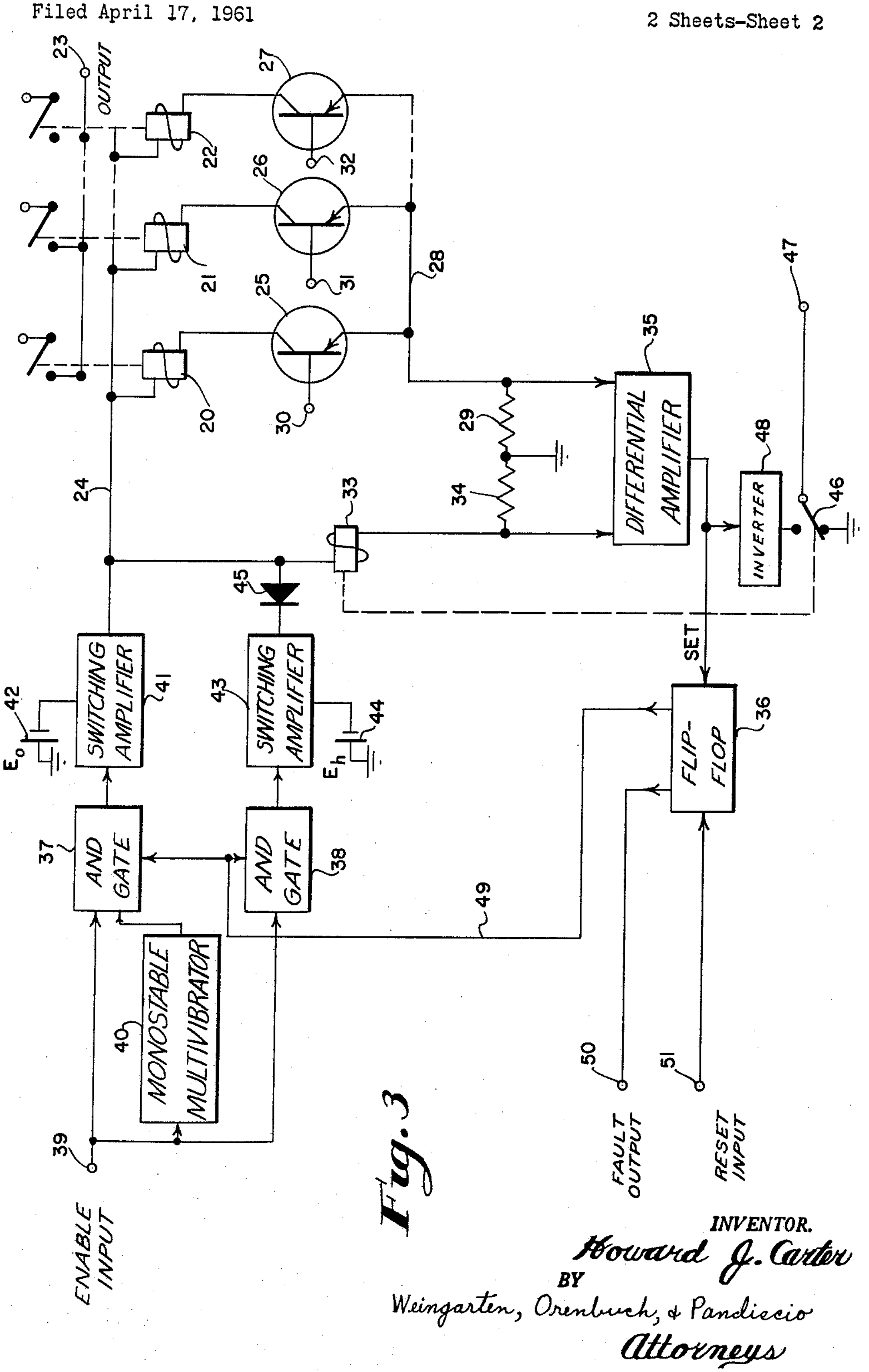

FIG. 3 schematically portrays a preferred embodiment of the invention; and

Figure 4:
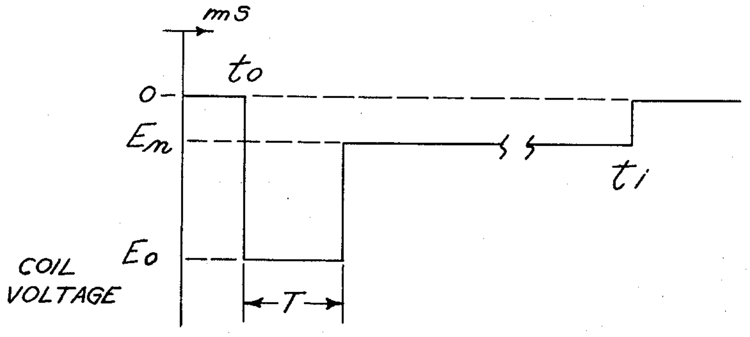
Figure 5:
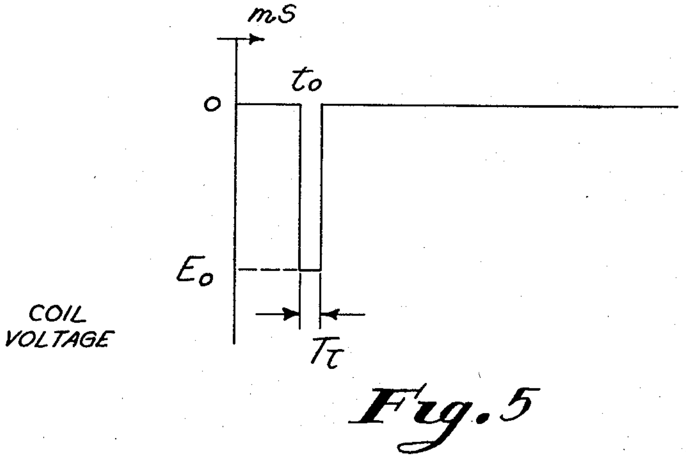

FIGS. 4 and 5 are waveforms pertaining to the operation of the preferred embodiment.

Figure 1:
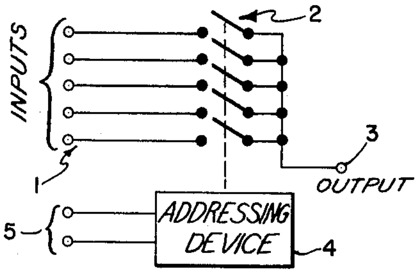
FIG. 1 depicts the essential features of a multiplexing system.

A rudimentary multiplexing system is shown in FIG. 1 having a plurality of inputs 1 connected by an equal number of switches 2 to a common output terminal 3. The addressing device 4 is required to close one and only one switch when the address of that switch is received over the lines 5.

Figure 2:
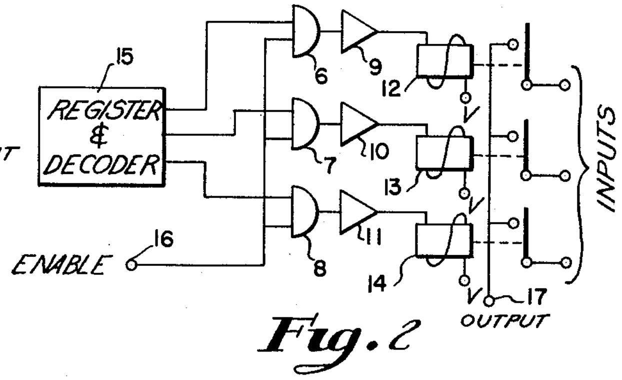
FIG. 2 shows a conventional multiplexing system employing relays.

The addressing device and switches of FIG. 1 conventionally consist of a set of AND gates 6, 7, 8 as shown in FIG. 2, having their outputs connected respectively to relay driving amplifiers 9, 10, 11. The driving amplifiers furnish the electrical currents to the windings of the relays 12, 13, and 14. Each AND gate has one input connected to the register and decoder 15, the decoder being arranged to supply an energizing input to only one of the gates in accordance with a code designating the selected relay. A terminal 16 is connected in common to an input terminal of each AND gate permitting an enable signal representing the instruction to "select an input" to be applied to the gates. The enabled gate passes a signal to its driving amplifier which thereupon supplies a current to the associated relay winding causing the relay's contact to close and connect its input to output terminal 17. When a failure occurs in the decoder or in the AND gate or in the driving amplifier, more than one relay may be energized. Although extra contacts may be provided on the relays to indicate when more than one relay is energized, they cannot prevent such an occurrence. The invention is intended to prevent the operation of more than one of the relays during the same interval and to provide an output indicating that a fault has occurred where more than one relay or none of the relays attempt to operate.

Referring now to FIG. 3, a group of channel selector relays, which may easily total several thousand in number, are represented by relays 20, 21, and 22. Each relay controls a contact whereby a signal input channel can be connected to the multiplexing system's output terminal 23. The winding of each relay is connected at one end to a bus 24 and at its other end each winding is connected to the collector of a transistor, such as transistors 25, 26, and 27. All the transistors have their emitter connected to a common line 28 which is connected to ground through resistor 29. When a particular input channel is to be connected to the output terminal 23, a signal is applied to the base 30, 31, or 32 of the appropriate transistor to cause the transistor to be biased to a condition where its forward impedance is low. A comparison relay 33 has its winding connected at one end to bus 24 and its other end connected through resistor 34 to ground. The voltage drops across resistors 29 and 34 are employed as the inputs to a differential amplifier 35 whose output is applied to the "set" input of a flip-flop 36. One output of flip-flop 36 provides an enabling signal to AND gates 37 and 38, when the flip-flop is in the "reset" state. A terminal 39, at which enabling signals are impressed, is connected to inputs of gates 37 and 38 as well as the input to monostable multivibrator 40. The output of the multivibrator is one of the three inputs to AND gate 37 which must be simultaneously energized to enable the gate to pass a signal from terminal 39 to a switching amplifier 41. The switching amplifier is arranged, when energized by an output from gate 37, to connect a source of current 42 to bus 24. A second switching amplifier 43 is arranged, when energized by an output from gate 38, to connect a different current source 44 to bus 24. A diode 45 is provided to prevent current source 42 from discharging through source 44 when both current sources are simultaneously connected to the bus. The comparison relay 33 controls a contact 46 which in one position connects terminal 47 to ground and in the other position connects that terminal to the ouput of an inverter 48 having its input derived from differential amplifier 35. Flip-flop 36 has one of its outputs connected by line 49 to AND gates 37, 38, and has its other output connected to a fault output terminal 50. The flip-flop is arranged to be reset by a signal applied to terminal 51.

In the description below of the operation of the embodiment of the invention, shown in FIG. 3, it is assumed that the signal voltages and the voltages applied to the relay windings are of negative polarity with respect to ground. Prior to the application of an enabling signal at terminal 39, the input channel to be connected to output terminal 23 has been selected by applying a biasing signal to the base of one of the transistors, for example, to the base 30 of transistor 25; monostable multivibrator is in its stable state, thereby supplying an inhibiting signal to AND gate 37; and switching amplifiers 41 and 43 isolate their respective current sources 42 and 44 from bus 24. Upon the arrival of a negative enable signal at input terminal 39, monostable multivibrator 40 is triggered to its quasi-stable state and thereupon emits a signal permitting AND gate 37 to pass the signal on terminal 39 to the input of switching amplifier 41. Provided that flip-flop 36 remains in the "reset" state, AND gate 37 remains enabled during the quasi-stable state of the multivibrator. Upon the reception of the signal passing through gate 37, amplifier 41 connects the current source 42 to bus 24. The voltage on bus 24 energizes that relay in the group which had been selected prior to the arrival of the enable signal at terminal 39, in this case, the relay 20 is energized since transistor 25 is biased to permit current to flow through it whereas all the other transistors are biased off. At the same time, the voltage on bus 24 energizes comparison relay 33 causing contact 46 to connect terminal 47 to the output of inverter 48. The current drawn through the winding of relay 20 causes a potential drop across resistor 29, whereas the current drawn through the winding of comparison relay 33 causes a potential drop across resistor 34. The potential drops across resistors 29 and 34 are compared by differential amplifier 35 which responds only to the difference between the voltages applied to its inputs. The amplifier provides an output when the two input voltages differ by an amount greater than the variation expected from relay winding impedances and the saturation resistance of the transistors. When the potential drops across resistors 29 and 34 differ by an amount greater than the variation expected from variations in relay windings or in the resistance of the transistors, amplifier 35 emits a negative output indicating that a faulty condition exists. Where two relays 20 and 21 had been simultaneously selected or where a relay winding has been short circuited, the drop across resistor 29 would be at least twice the drop across resistor 34, causing the amplifier to indicate a "fault" condition. Those conditions with others which may be easily imagined, will cause a negative signal to be present at the output of differential amplifier 35.

Assuming that no fault condition exists, then the bus 24 will be energized at $E_o$ volts by the source 42 for a time determined by the period of monostable multivibrator 40. That period is chosen to be somewhat longer than the maximum time required for a pulse at $E_o$ volts to close the contacts of any of the relays in the group. The comparison relay 33 is chosen so that it has operate and release voltage levels and dynamic characteristics similar to those of the selector relays in the group. At the termination of the quasi-stable state of the monostable multivibrator, AND gate 37 is inhibited by the multivibrator's return to its stable state, causing the gate to isolate terminal 39 from the switching amplifier 41. Switching amplifier 41, in the absence of an input signal, disconnects bus 24 from the source 42.

The enable signal, impressed at terminal 39, initially passes through AND gate 38, provided flip-flop 36 is in its "reset" state, and actuates the switching amplifier 43 at the same time that switching amplifier 41 is actuated. Both switching amplifiers, therefore, connect their respective current sources to bus 24. However, the source 42 has the higher negative voltage and would discharge through the lower voltage source 44 were it not for diode 45 which is arranged to disconnect source 44 from the bus so long as source 42 is connected to it. With the de-energization of switching amplifier 41, diode 45 permits source 44, whose voltage is $E_h$, to be connected to bus 24 and hold selected relay 20 and comparison relay 33 in their energized positions. Upon the energization of the comparison relay, the contact 46 had switched from ground to the output of the inverter 48. The inverter is arranged to provide a negative signal in the absence of a negative output from the differential amplifier. The negative signal at terminal 47 indicates that the multiplexing system is operating normally and the terminal 47 may be connected to equipment, not shown, permitting the normal output of the system to be used in the associated output equipment or may be connected to external apparatus which indicates the state of the selector relays. With correct operation of the multiplexing system, the differential amplifier's output is zero and flip-flop 36 remains in its "reset" state.

FIG. 4 shows the cycle of relay energizing when no fault exists in the multiplexing system. The voltage applied to the relay windings is initially zero with both current sources disconnected from bus 24. When the enable signal appears on terminal 39 at time $t_0$, the voltage applied to the selected relay winding drops to $E_o$, the voltage of source 42 and remains at $E_o$ for the interval T in which the monostable multivibrator is in its quasi-stable state. The interval T is sufficiently long so that the contact of the selected relay is sure to close. At the end of interval T, AND gate 37 is inhibited and source 44 is connected to bus 24, replacing source 42. The voltage applied to the relay winding, therefore, rises to the $E_h$ level, a level sufficient to hold the contact of the selected relay closed. The energized selected relay is "held" until the enable signal decays to zero at time $t_1$. During the "hold" interval, the potential drops across resistors 29 and 34 are equal but less than the values obtaining during the T interval.

Where a fault occurs tending to cause another relay in the group to be operated, the potential drop across resistor 29 will increase due to the current starting to flow in that relay's winding. Amplifier 35 is sufficiently sensitive to detect the small unbalance in potential and thereupon emits a negative output which causes flip-flop 36 to be "set." Upon being "set," flip-flop 36 places a "fault" signal on terminal 50 and causes AND gates 37 and 38 to be inhibited. The inhibition of those AND gates causes the switching amplifier 43 to disconnect holding source 44 from bus 24. The inhibition of gate 37 prevents further attempts to energize the selector relays until flip-flop 36 is reset by an appropriate signal applied to terminal 51. When the differential amplifier's output goes negative, the output of inverter 48 becomes zero, indicating at terminal 47 that the operation of the multiplexing is abnormal. The sequence of events takes place so swiftly that the voltage is removed from bus 24 before the faulty operation can cause the other relay to operate. Since the voltage was removed from the bus when the fault occurred, comparison relay 33, as well as the selected relay in the group, are returned to their de-energized state, whereupon the contact 46 of the comparison relay connects the terminal 47 to ground. That terminal was set to zero volts immediately upon detection of the fault and its subsequent connection to ground does not change its signal potential.

In describing the operation of the system, it has been assumed thus far that a single relay, the relay 20, was selected and that a fault occurred during the "hold" period of the selected relay. Where a fault condition exists before the application to terminal 39 of the enable input, when the enable input appears, the monostable multivibrator is triggered, permitting the enable signal to pass through AND gate 37 to the input of switching amplifier 41. That amplifier connects source 42 to bus 24 so that $E_o$ volts is applied to the winding of the selected relay. The differential amplifier 35 puts out a negative signal as soon as the time constant of the inductance of the relay winding and the resistance of resistor 29 permits. The differential potential drops across resistors 29 and 34 will exceed the threshold value required to cause amplifier 35 to produce a negative output long before the armature movement of the selected relay and the comparison relay begins. Fip-flop 36 is therefore immediately "set" by the negative signal from the differential amplifier, causing switching amplifiers 41 and 43 to disconnect their voltage sources from the bus 24. The resultant excursion of voltage applied to the relay windings is depicted in FIG. 5. The interval denoted $T_t$ is the time required for the differential amplifier to detect the fault condition when the source $E_o$ is connected to bus 24 at time $t_o$. The $T_t$ interval is dependent upon the balance adjustment of the differential amplifier and the parameters of the relay winding circuit. With relays requiring 5 milliseconds for their armatures to operate, a typical value for $T_t$ is one-tenth of the operating time, i.e., 0.5 millisecond.

The invention illustrated in FIG. 3 may be modified by employing a push-pull output from differential amplifier 35 and connecting both outputs from that amplifier to an OR gate which is arranged to "set" flip-flop 36 whenever the amplifier's inputs are unbalanced in either direction. By employing that arrangement, the flip-flop will be "set" when selector relay faults or comparison relay faults occur. Other modifications of the invention may be made without departing from the essential concept of the invention, and indeed are apparent to those skilled in the electronics art. It is intended, therefore, that the invention not be limited to the precise arrangement depicted in the drawings, but rather that the invention's scope be construed as delimited by the appended claims.

What is claimed is:

1. In a multi-plexing system of the type employing a plurality of selector relays to connect a selected input channel to the system's output, fault detecting apparatus comprising a comparison relay, a differential amplifier for comparing the current flowing through the winding of the comparison relay and the current flowing through the windings of the selector relays, the differential amplifier determining when an unbalance exists, means providing an input enabling signal to the system, a flip-flop having one input coupled to the output of the differential amplifier, switching means responsive to the enabling signal for connecting a source of current to all the relay windings, means for gating the enabling signal to the switching means, and the flip-flop being connected to inhibit the gating means in response to an output from the differential amplifier caused by an unbalance.

2. In a multi-plexing system of the type employing a plurality of selector relays to connect a selected input channel to the system's output, fault detecting apparatus comprising: a comparison relay, a differential amplifier for comparing the current flowing through the winding of the comparison relay and the current flowing through the windings of the selector relays, the differential amplifier providing an output signal in response to an unbalanced input, a flip-flop responsive to the output of the differential amplifier, means providing an input enabling signal to the system, switching means responsive to the enabling signal for connecting a source of current to all the relay windings, a gate controlling the transmission of the enabling signal to the switching means, means responsive to the enabling signal for causing the gate to remain open for a predetermined interval, and the flip-flop being connected to inhibit the gate in response to an output from the differential amplifier.

3. In a multi-plexing system of the type employing a plurality of selector relays to connect a selected input channel to the system's output, fault detecting apparatus comprising: A comparison relay, a differential amplifier, means connecting one input of the differential amplifier to the winding of the comparison relay, means connecting the other input of the differential amplifier to the windings of the selector relays, the differential amplifier providing an output signal in response to an unbalance of its inputs, means providing an input enabling signal to the system, switching means responsive to the enabling signal for connecting a source of current to all the relay windings, means connected to each selector relay winding for permitting current to flow through that winding in response to a biasing signal, a gate controlling the transmission of the enabling signal to the switching means, a monostable multivibrator responsive to the initiation of the enabling signal for causing the gate to remain open for a predetermined interval, and a flip-flop coupled to the output of the differential amplifier, the flip-flop being connected to inhibit the gate in response to an output signal from the differential amplifier.

4. In a multi-plexing system of the type employing a plurality of selector relays to connect a selected input channel to the system's output, fault detecting apparatus comprising: a comparison relay, a differential amplifier having its inputs connected to compare the current flowing in the winding of the comparison relay with the current flowing in the windings of the selector relays, the differential amplifier providing an output signal in response to an unbalance of its inputs, means providing an input enabling signal to the system, first switching means responsive to the enabling signal for connecting a first source of current to all the relay windings, a first gate controlling the transmission of the enabling signal to the first switching means, a monostable multivibrator responsive to initiation of the enabling signal for causing the first gate to remain open for a predetermined interval, a second switching means responsive to the enabling signal for connecting a second source of current to all the relay windings, a second gate controlling the transmission of the enabling signal to the second switching means, means for preventing the second source from supplying current to the relay windings when the first source is connected to those windings, and a flip-flop coupled to the output of the differential amplifier, the flip-flop being connected to inhibit the first and second gates in response to an output signal from the differential amplifier.

References Cited in the file of this patent

UNITED STATES PATENTS

| | | |
|---|---|---|
| 2,527,650 | Peterson | Oct. 31, 1950 |
| 2,712,101 | Salati | June 28, 1955 |
| 2,872,521 | Morris | Feb. 3, 1959 |